Jan. 22, 1963  H. A. LEFLET, JR  3,074,258
APPARATUS FOR CLEANING GLASS SHEETS
Filed Nov. 4, 1958  2 Sheets-Sheet 1
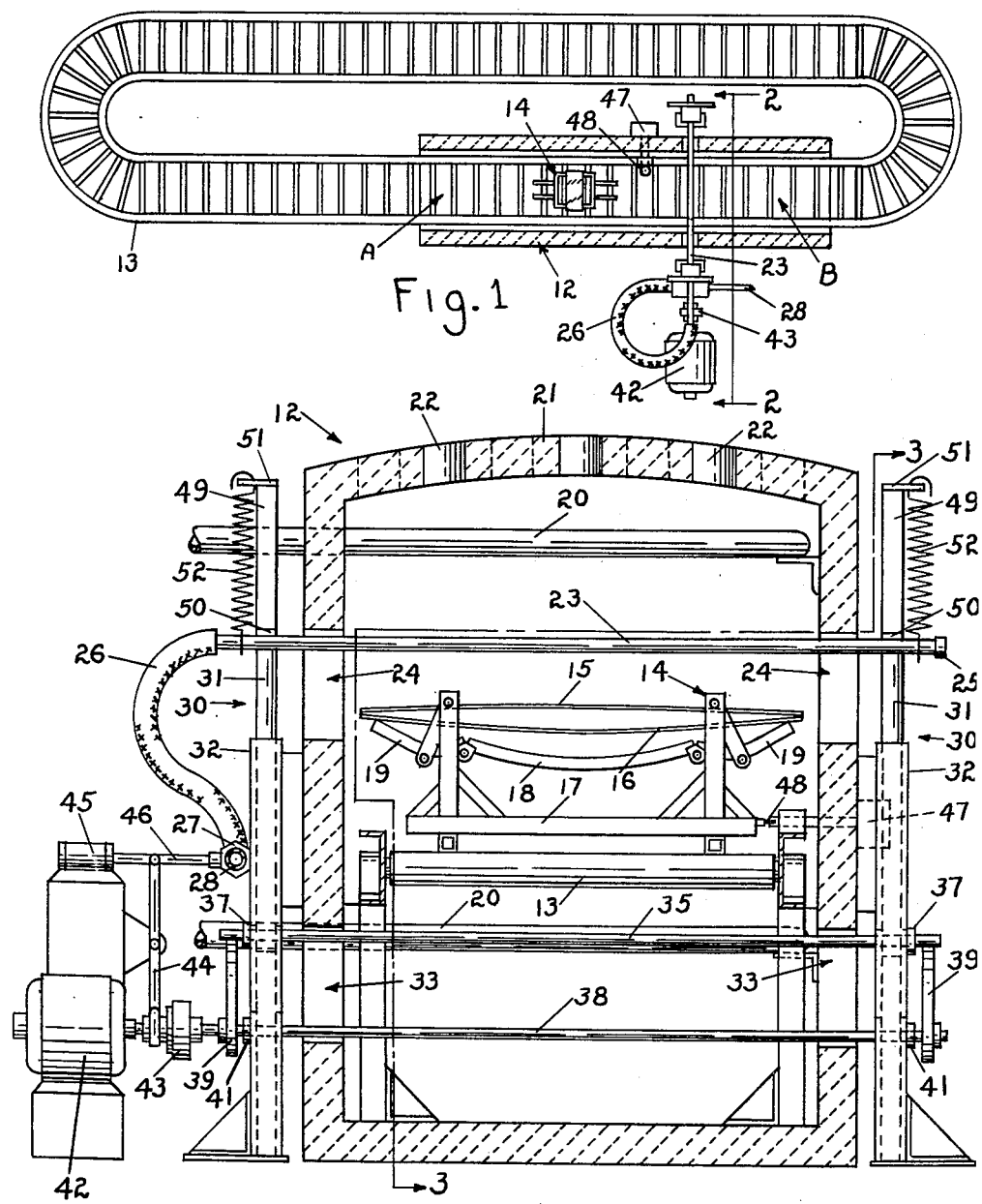
INVENTOR.
Herbert A. Leflet, Jr.
BY
Nobbe & Swope
ATTORNEYS

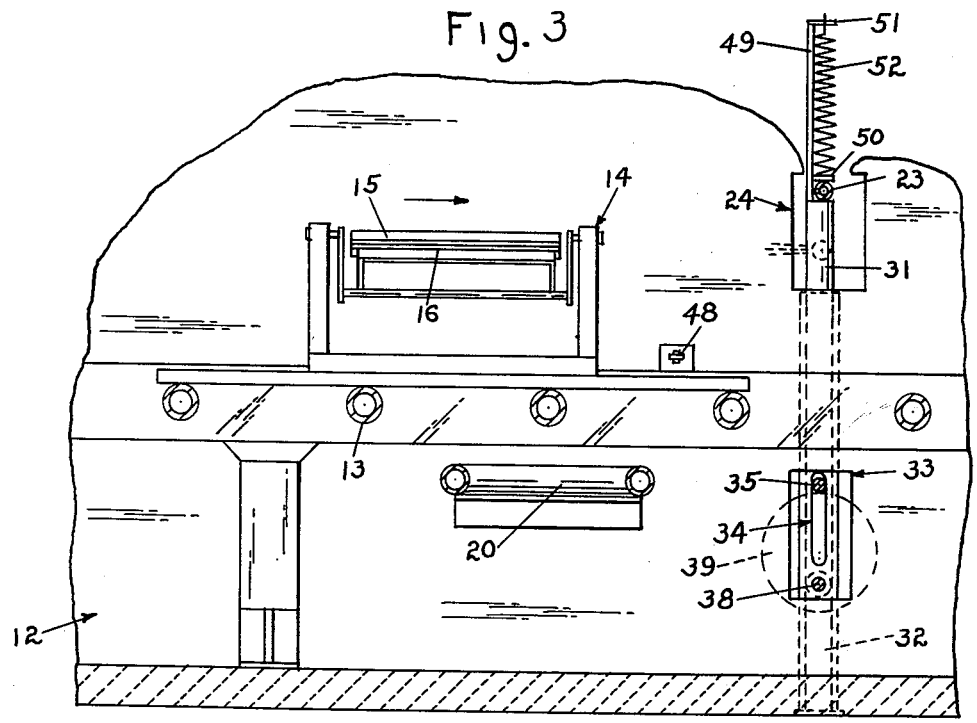

United States Patent Office 3,074,258
Patented Jan. 22, 1963

3,074,258
APPARATUS FOR CLEANING GLASS SHEETS
Herbert A. Leflet, Jr., Toledo, Ohio, assignor to Libbey-Owens-Ford Glass Company, Toledo, Ohio, a corporation of Ohio
Filed Nov. 4, 1958, Ser. No. 771,920
5 Claims. (Cl. 65—159)

The present invention relates generally to the cleaning of glass sheets, and more particularly to a novel apparatus for cleaning facing surfaces of a plurality of glass sheets to be simultaneously bent.

This application is a continuation-in-part of copending application 681,005, filed August 29, 1957, now Patent No. 2,985,986, issued May 30, 1961.

It has been found that the most efficient manner of manufacturing a bent glass laminate, for example a windshield, is to bend both sheets of a given laminate at the same time so that the curvature of each of the sheets will be substantially identical. At the same time, however, the presence of foreign matter between the sheets has always been a problem since a certain percentage of bent sheets have had to be rejected because of pitting which is causd by foreign matter trapped between the sheets during the bending thereof.

In the production of severely bent sheets, the pitting problem becomes even more important since in order to make relatively sharp bends in portions of the sheets it is necessary that those portions be heated to a relatively high temperature and become more softened and thus are more susceptible to being marred by foreign material located between the sheets.

To partially eliminate the pitting problem, various new methods have been employed to scrub and wash the sheets of glass prior to a pair of sheets being mounted on a bending mold and bent into conformity therewith. In spite of all these precautions, the losses in severely bent sheets have been relatively high and in the case of certain bends have amounted to as much as 30%. This is believed to be due to the fact that during subsequent handling of sheets after washing a certain amount of foreign abrasive material becomes deposited on the surfaces thereof. This is particularly the case when the sheets are placed in contact with one another which usually causes some grating contact of sheet edges and results in minute particles of glass becoming entrapped between the facing sheet surfaces.

In accordance with the present invention, entrapped foreign material between a pair of glass sheets is removed by heating the sheets in such a manner that at least one of the sheets bows away from the other and leaves a gap therebetween, and then directing a stream of fluid, preferably air, through the gap between the sheets thus blowing out foreign material deposited on the facing sheet surfaces.

It is therefore an important object of the invention to provide an improved apparatus for cleaning the facing surfaces of a plurality of glass sheets.

Another object of the invention is to provide apparatus for cleaning the facing surfaces of a plurality of glass sheets which are to be bent immediately prior to the bending thereof and while the sheets are hot.

A further object of the invention is to provide such an apparatus in which the sheet surfaces are heated to less than bending temperature and cleaned while not materially cooling the sheets so that they can be bent immediately thereafter.

Other objects and advantages of the invention will become more apparent during the course of the following description when taken in connection with the accompanying drawings.

In the drawings, wherein like numerals are employed to designate like parts throughout the same:

FIG. 1 is a plan view of a continuous type furnace having the novel cleaning apparatus of the invention associated therewith;

FIG. 2 is an enlarged cross sectional view taken along lines 2—2 of FIG. 1;

FIG. 3 is a longitudinal sectional view taken along lines 3—3 of FIG. 2 showing the proper operation of the novel sheet cleaning device of the invention;

FIG. 4 is a fragmentary longitudinal sectional view similar to FIG. 3 but illustrating the movement of the novel sheet cleaning device in the case of malfunction of the control apparatus; and FIG. 5 is a cross sectional view taken along the lines lines 5—5 of FIG. 4.

Briefly stated, the present invention comprises a novel apparatus for cleaning and bending glass sheets in pairs in which a pair of glass sheets are heated with sufficient heat being directed toward the surface of one of the sheets in a relatively short time interval so as to cause a temperature differential to exist between the opposite sheet surfaces. This causes the hotter surface to expand for a greater distance and more rapidly than the other thus causing the sheet to bow in the direction of the hottest surface and creating a gap between the sheets through which a stream of gas, preferably air, is directed and contacts the adjacent facing surface of each of the sheets to sweep them clear of foreign material.

As set forth in copending application 681,005 the apparatus of the present invention is primarily concerned with the production of windshields for automobiles. This apparatus is particularly effective in the manufacture of the commonly known panoramic type windshield that because of its relatively severe curvature adjacent the swept back end portions has proved to be costly to manufacture because of the relatively great amount of heat required to be concentrated upon the portions of maximum curvature which in turn makes these areas more susceptible to pitting.

The apparatus for cleaning and bending glass sheets is shown in FIGS. 1 to 5 and comprises a bending furnace 12 of the tunnel type having entry and exit openings and a continuous roller type conveyor 13 passed therethrough. The conveyor 13 is adapted to convey bending molds 14 supporting a pair of glass sheets 15 and 16 to be bent into and through the furnace along a predetermined path wherein the temperature of the sheets is gradually raised to bending temperature after which the sheets are bent into conformity with the mold shaping surface.

The type of mold used has a substantially rigid rectangular base 17 which serves to actuate the new and novel cleaning device of the present invention, as will later be described in detail. As shown in FIG. 2, the bending mold may be of the usual multi-section type having a center section 18 and end sections 19 with the glass sheets 15 and 16 being supported thereabove by resting upon the outermost ends of the mold end sections 19.

Furnaces of the type described herein are generally divided into at least two heating zones including an entry or preheat zone A in which the glass sheets are gradually brought to bending temperature, and a bending zone B of higher temperature in which the glass sheets are bent into conformity with the mold. The furnace 12 may be heated from above the conveyor 13 by means of radiant heaters or it may be heated from both above and below the conveyor.

Good results have been obtained when using furnaces of the type employing radiant tubes which, as shown in FIGS. 2 and 3, comprise a plurality of hair-pin type hollow metallic tubes 20 into one end of which a flame is directed to heat the tubes so that the outermost surface of the tubes radiates heat. Such tubes are usually positioned beneath the top wall 21 and above the conveyor 13 to direct beams of radiant heat toward the path of the glass sheets through the furnace 12.

As a general rule, those tubes disposed in the preheat zone of the furnace would not be heated to a temperature sufficient to concentrate enough heat upon the uppermost sheet 15 to cause this sheet to bow away from the other. However, in order to bow the sheet sufficient heat must be concentrated thereon so as to heat the uppermost sheet surface to a higher temperature than the lowermost surface in a relatively short amount of time so that the difference in temperatures between the two surfaces will cause the sheet to bow upwardly as shown in FIG. 2 thus creating the gap between the sheets through which the blast of air is directed. Therefore, it is desirable to provide a series of cup type radiant burners 22 in the entry portion of the preheat zone so as to provide the additional heat. Suitable heat sources may be burners or radiators of the type disclosed in U.S. Patent 2,618,906, issued November 25, 1952, to F. O. Hess. Although the use of such burners is recommended, the first two or three tubes could be heated to a sufficiently high temperature but this would generally be found uneconomical since the tube life would be materially shortened.

The cleaning apparatus of the present invention includes a hollow preferably rigid conduit 23 which has a sufficiently large internal diameter to carry the large amount of gas used to clean the sheets 15 and 16 and which is movably mounted in the rear of the furnace zone A immediately ahead of the bending zone B. The elongated tubular conduit 23 extends horizontally across the furnace 12 normal to the path of the conveyor 13 in order to blow a uniformly distributed amount of cleaning fluid in the plane of the sheets. To reduce the mass of the apparatus contained within the zone A, the opposite ends of the conduit 23 extend outward from the walls of the furnace 12 through vertical elongated openings 24 which permit vertical movement of the conduit while minimizing heat loss. A suitable cap 25 covers one end of the conduit 23 to form an air tight seal that prevents leakage of the gas.

One end of a hollow flexible conduit 26 is connected to the other end of the rigid conduit 23 while a suitable source (not shown) of gas, such as air under pressure, is connected to the opposite end of the flexible conduit 26 by means of a quick opening valve 27 and pipe 28. If desired, the air may be heated so that the glass sheets will not be chilled and if an exceptionally large amount of air is required the source may also be connected to the sealed end of the conduit 23 by removing the cap 25 and connecting a second flexible conduit thereto.

To direct a substantially continuous gaseous stream between a pair of moving glass sheets and in a direction opposite to their movement as will later be described in detail, the tubular conduit 23 is provided with a plurality of relatively closely spaced circular orifices 29 which extend across substantially the entire length of the conduit 23 within the furnace 12 and are located along a centerline which is substantially parallel to the glass sheets 14 and 15 to uniformly distribute the gas between the sheets. As seen most clearly in FIG. 5 the orifices 29 extend beyond the edges of the conveyor 13 to ensure complete distribution of the gas across the gap between the sheets 15 and 16. Preferably, the orifices 29 shown in FIG. 5 are uniformly spaced on one inch centers and have diameters of $\frac{1}{16}$ inch while the diameter of the rigid conduit 23 is sufficient to minimize any pressure drop across its length.

In order that the conduit 23 may be moved from an inactive position above the conveyor 13 and the top of molds 14 to an actuated position in the plane of the glass sheets 15 and 16 whereby fluid is emitted from the orifices 29 to clean the facing surface of the sheets the conduit is carried by a vertically movable frame or support means 30 shown most clearly in FIG. 2. The frame 30 comprises a pair of elongated upwardly extending cylindrical support members 31 which are positioned outwardly from the orifices 27 adjacent the cap 25 and the slot 24 thereby permitting the fluid to leave the orifices 27 in an unobstructed path.

Each support member 31 is slidably received within a hollow vertical pillar member 32 rigidly mounted in the upright position by means of brackets which are in substantial alignment with the slots 33 to maintain the conduit 23 in the proper position relative to the conveyor 13 and the slots 33. As seen most clearly in FIGS. 3 and 4 the pillars 32 have diametrically opposed aligned slots 34 adapted to receive a horizontal lifting member for the support member 31 in the form of an elongated solid cylindrical rod 35 which extends through the slots 33 and has a diameter slightly less than the width of the slots 34 to provide a sliding fit. The rod 35 extends not only transversely across the furnace 12 parallel to the conduit 23 through both pillars 32 but also through a suitable aperture 36 provided in the lowermost end portion of each support member 31. Thus, it is apparent that as the rod 35 moves up and down in the slots 34 the support members 31 will likewise be so moved. Endwise movement of the member 35 is prevented by means of suitable collars 37 adjustably secured to the portions of the member adjacent the slots 34.

Also extending through suitable aligned openings provided in the pillar 32 below the slots 34 is a rotatable drive shaft 38 which rigidly carries a pair of eccentrically mounted circular cams 39 that contact the outer ends of the lift bars 35. The drive shaft 38 is suitably journaled in bearings 40 rigidly secured in each pillar 32. Endwise movement of the drive shaft 38 within the journal bearings 40 is prevented by suitable collars 41 secured to the drive shaft adjacent the pillars 32.

The drive shaft 38 and attached cams 39 are rotated by a suitable motor 42 which is operatively connected to the end of the drive shaft that extends from the furnace 12 by means of a suitable single revolution clutch 43 that is actuated by a pivoted throw arm 44. The motor 42 is continuously running and upon shifting of the throw arm the clutch 43 is engaged for a single revolution of the drive shaft 38 and upon the completion of one revolution the clutch is automatically disengaged. The throw arm 44 is operated by an electrically operated solenoid 45 which is connected to both the throw arm and the air valve 27 by means of a shaft 46 extending therefrom and power is supplied to the solenoid 45 from a control panel 47 mounted outside the furnace 12. The control panel 47 is energized by a suitable switch 48 which is mounted along the conveyor 13 and is actuated by the base 17 of the bending mold 14 as it moves thereby.

More particularly, as the bending mold 14 passes along the conveyor 13 through the heating zone A to the predetermined position of the actuating switch 48 at which time this switch is depressed by the base 17. This energizes the solenoid circuit through the control panel 47 which moves the shaft 46 outwardly away from the furnace 12 thereby actuating the clutch 43 for a single revolution of the drive shaft 38, and the outward movement of the shaft 46 opens the valve 27 which furnishes fluid to the conduit 23. The valve 27 remains open as long as the switch 48 is actuated and when the mold 14 progresses past the switch 48 a suitable spring within the solenoid 45 moves the shaft 46 toward the furnace thereby closing the valve 27.

The rotation of the clutch 43 causes the drive shaft 38 to rotate the cams 39 through one complete revolution thereby moving the conduit 23 from the inoperative upper position shown in FIG. 3 to the operative position shown by the dotted line in FIG. 3 and back to the upper inoperative position. As the conduit moves downward the fluid emitting from the orifices passes between the facing surfaces of the glass sheets 15 and 16 thereby blowing foreign particles therefrom.

An added feature of the present invention is the safety device utilized by the frame 30 to prevent damage to the glass sheets and molds in case of malfunctioning of any parts of the system which might permit the conduit to remain in the lower active position thereby allowing the mold 14 to strike the conduit 23 as shown in FIG. 4. Extending upwardly from each support member 31 on the side toward the switch 48 is an elongated rigid carrier rod 49 as shown in FIGS. 2 to 4. Immediately above the conduit 23 which normally is adjacent the top surface of the support member 31 is a horizontally extending bracket 50 which is rigidly secured to each carrier rod 49 and serves to engage and retain the conduit 23. A horizontally extending hanger plate 51 is rigidly secured to the uppermost end of each carrier rod 49 and a suitable spring 52 depends therefrom, which in turn is secured to the conduit 23.

The brackets 50 extend in the direction of movement of the mold 14 and the springs 52 are normally extended under tension to maintain the conduit 23 in contact with the brackets 50. Thus, if the conduit remains in the path of the mold as shown in FIG. 4, it will be moved out of engagement with the brackets 50 and as soon as it clears the brackets 50, it will be drawn upward toward the hanger plates 51 and away from the conveyor 13 by means of the spring 52 as shown by the dotted lines in FIG. 4 thereby permitting unrestricted movement of the mold 14 along the conveyor 13.

It is to be understood that the form of the invention disclosed herein is to be taken as the preferred embodiment thereof, and that various changes in the shape, size and arrangement of parts may be resorted to without departing from the spirit of the invention or the scope of the following claims.

I claim:

1. In an apparatus for cleaning and bending glass sheets, the combination comprising, a furnace having an entrance opening and an exit opening, a bending mold for supporting a plurality of glass sheets to be bent thereon, a conveyor for moving said bending mold and sheets through the furnace, a substantially tubular conduit extending across the interior of said furnace and having plurality of orifices formed therein for emitting a fluid therefrom, support means mounting said conduit for movement both into and out of the path of movement of said mold through said furnace, and actuating means responsive to the movement of said mold and operatively connected with said support means for actuating said support means and effecting said movement of the conduit.

2. In an apparatus for cleaning and bending glass sheets, the combination comprising, a furnace having an entrance opening and an exit opening, a bending mold for supporting a plurality of glass sheets to be bent thereon, a conveyor for moving said bending mold and sheets through the furnace, a substantially tubular conduit extending across said furnace and having a plurality of orifices formed therein for emitting a fluid therefrom, support means mounting said conduit for movement both from a first position removed from the path of movement of said mold through said furnace to a second position proximate said path of movement of the mold and from said second position back to said first position, actuating means responsive to the movement of said mold and operatively connected with said support means for actuating said support means and effecting said movement of the conduit, and safety means cooperatively associated with said support means for enabling auxiliary movement of said conduit from said second position to a further position remote from the path of movement of said mold, said safety means being operable to effect said auxiliary movement only upon failure of said actuating means to induce movement of the conduit from said second position to said first position.

3. In an apparatus in accordance with claim 2, in which said safety means includes a pair of retaining brackets affixed to said supporting means and engaging said conduit, and spring means secured at one end to said conduit and at the other end to said supporting means at a point above the path of movement of said mold, said conduit normally being urged into retaining engagement with said brackets by the extension of said spring means but operable to be disengaged from said brackets and moved to said further position by the compression of said spring means upon said mold striking said conduit.

4. In an apparatus for cleaning and bending glass sheets, the combination comprising, a furnace having an entrance opening and an exit opening, a bending mold for supporting a plurality of glass sheets to be bent thereon, a conveyor for moving said bending mold and sheets through the furnace, a substantially tubular conduit extending horizontally through said furnace normal to the path of said conveyor and having a plurality of orifices formed therein, a source of fluid connected to said conduit and including valve means for supplying fluid to said conduit when said valve means is moved to an open position, support means mounting said conduit for movement both from a first popsition removed from the path of movement of said mold through said furnace to a second position proximate said path of movement of the mold and from said second position back to said first position, and actuating means responsive to the movement of said mold and operatively connected with said support means for actuating said support means and effecting said movement of the conduit, said actuating means additionally being operatively connected with said valve means to induce movement thereof to said open position upon said conduit being moved from said first to said second position.

5. In an apparatus for cleaning and bending glass sheets, the combination comprising, a furnace having an entrance opening and an exit opening, a bending mold for supporting a pair of glass sheets to be bent thereon in superimposed relationship, a conveyor for moving said bending mold and sheets through the furnace, heating means disposed within said furnace to direct sufficient heat towards a surface of one sheet to cause a temperature differential to exist between it and the other surface of said one sheet thereby causing said one sheet to bow in the direction of the hottest surface and create a gap between said pair of sheets, a substantially tubular conduit extending across said furnace and spaced from the entrance end thereof a sufficient distance that said one sheet has bowed when proximate to said conduit, said conduit having a plurality of orifices formed therein for emitting a fluid therefrom, support means mounting said conduit for movement both from a first position removed from the path of movement of said mold through said furnace to a second position proximate said path of movement of the mold and wherein said orifices are positioned so as to direct a stream of fluid through the gap between said sheets and from said second position back to said first position, and actuating means responsive to the movement of said mold through said furnace and operatively connected with said support means for actuating said support means and effecting said movement of the conduit.

References Cited in the file of this patent

UNITED STATES PATENTS

| | | |
|---|---|---|
| 1,674,414 | Ridley | June 19, 1928 |
| 1,809,534 | Tillyer et al. | June 9, 1931 |
| 1,880,257 | Kiefer | Oct. 4, 1932 |
| 2,144,320 | Bailey | Jan. 17, 1935 |
| 2,377,849 | Binkert et al. | June 12, 1945 |
| 2,486,153 | Gwyn | Oct. 25, 1949 |
| 2,525,725 | Rodman | Oct. 10, 1950 |
| 2,561,529 | Mongan | July 24, 1951 |
| 2,646,647 | Bamford et al. | July 28, 1953 |
| 2,671,241 | Starner | Mar. 9, 1954 |
| 2,713,011 | Durst | July 12, 1955 |
| 2,766,555 | Jendrisak et al. | Oct. 16, 1956 |
| 2,840,953 | Black | July 1, 1958 |